Oct. 11, 1960 R. H. RAUSCH 2,956,125

COLOR BURST GATING CIRCUIT

Filed May 14, 1956 2 Sheets-Sheet 1

INVENTOR:
ROBERT H. RAUSCH,
BY Donald N. Timbie
HIS ATTORNEY.

INVENTOR:
ROBERT H. RAUSCH,
BY Donald N. Timbie
HIS ATTORNEY.

2,956,125
Patented Oct. 11, 1960

2,956,125

COLOR BURST GATING CIRCUIT

Robert H. Rausch, North Syracuse, N.Y., assignor to General Electric Company, a corporation of New York Filed May 14, 1956, Ser. No. 584,721

9 Claims. (Cl. 178—69.5)

This invention relates to improvements in a color television receiver burst gating circuit and includes a novel filter for use therein as well as providing improvements in the automatic frequency control system for the line scanning oscillator.

In televising monochrome or "black and white" images, present standards require that the image be scanned in a series of parallel lines at the transmitter and that line synchronizing pulses be inserted in the signal at the end of each line. The signal between the line synchronizing pulses varies in amplitude with the brightness of the image along the scanning path. Present color television standards provide for the tranmission of color information by adding to this black and white or monochrome signal a carrier wave having a phase, depending on the hue of the scene at a given point in the scanning path, and an amplitude depending on the saturation of the color at the given point. As the scanning proceeds, the hue and color saturation of the scene may change independently of one another, thus causing the phase and amplitude of carrier wave to change in an independent manner. In order that the phase of the color carrier have some significance, it is necessary to provide a reference with which to compare it. In the present standards, this is achieved by inserting a burst of several cycles of a known phase of the color carrier after the line synchronizing pulses. However, these bursts do not occur during the scanning of a line so that circuits must be provided at the receiver for deriving from the bursts a reference carrier wave of the same frequency that is continuous throughout the line scanning interval. The reference wave does not change in phase so that the hue information represented by changes in the phase in the color carrier may be derived by comparing the phase of the color carrier and the reference wave. Although the term "color carrier" has been used, it is understood by those skilled in the art that it is comprised of the sidebands produced by the modulation process and that the carrier frequency itself is not present. The carrier frequency is derived from the bursts in the manner just described.

Therefore, it is apparent that the bursts must be separated from the rest of the received signals. This can be done by applying the entire signal to a gating circuit that blocks the passage of signal to its output except when it is opened and by opening the gate circuit only when the bursts are applied to its input. There are many gating circuits known to those skilled in the art, but most of them are opened by applying a keying pulse to them. For reasons well known to those skilled in the art, the phase of the reference wave derived from the bursts is constant as long as an integral number of cycles are passed by the gate circuit, but that the phase of the reference wave varies as different fractions of a cycle of the burst are passed by the gate circuit. This is true for fractions of one cycle or for an integral number of cycles plus a fraction of an additional cycle. Accordingly, if the gating circuit always permits any integral number of cycles of the burst plus a given fraction of another cycle to appear at its output, the phase of the reference wave remains the same. However, it would be very difficult to do this accurately and, therefore, it is preferable to open the gate just before the burst begins and to close it just after the burst ends. As great care is taken at the transmitter to insure that the bursts have an integral number of cycles, a gating circuit that lets the entire burst pass to its output will not disturb the phase of the reference carrier.

It has been customary to open the gate circuit during the burst interval in response to keying pulses derived from the electromagnetic deflection circuit of a television receiver.

As is well known by those skilled in the art, the supply of current to the deflection circuit is sharply cut off at the end of each scanned line so that the deflection system starts to oscillate at its resonant frequency. Such oscillation might gradually diminish in amplitude over a substantial period of time if it were not for the provision of means such as damper diodes for permitting only one half cycle of oscillation. During this half cycle of oscillation, the deflection circuit causes the beam being deflected to retrace or fly back to a point where it can start scanning another line. By a suitable coupling to the deflecting system, what is known as a "flyback pulse" may be derived therefrom. This pulse is produced by the current in the deflection system during the half cycle of oscillation referred to above. Because the bursts usually occur at about the same time as the flyback interval, the flyback pulse may be used as a keying pulse for the gating circuit. However, if it does not occur at precisely the right time, it may be necessary to alter its phase.

In some types of deflection systems, the "flyback pulse" is substantially a half of a sine wave having a frequency equal to the resonant frequency of the system. However, in other types of deflection systems, the "flyback pulse" contains a large amount of a harmonic of the resonant frequency of the deflection system. A keying pulse derived from such a "flyback pulse" has two or more peaks, the number and portion depending on the particular harmonic involved and the phase of the harmonic. Many gate circuits are such as to open during each peak and close in between peaks. Therefore, instead of passing the entire burst, the gate circuit passes two or more portions of the burst. Under these conditions, the chance of the same portion of the burst cycles appearing at the output of the burst gate is remote so that the phase of the reference wave derived from the burst will vary during operation and the hue of colors reproduced by the receiver will change in an uncontrolled manner. Furthermore, the loss of any cycles of the burst cannot generally be tolerated as the total number of cycles is just large enough as it is to provide sufficient energy to enable the circuits coupled to the burst gate to derive a reference wave that is reasonably free from the effects of noise.

Accordingly, it is an object of this invention to provide an improved burst gate system wherein the effects of harmonics that would otherwise be present are avoided.

Briefly, this object may be attained by providing means for attenuating or eliminating the harmonic content from the "flyback pulse" or from the keying pulse.

Whereas attenuation or elimination of the undesired harmonic from the keying pulse can be achieved by the use of known trap circuits, filters and the like, it has been found that they produce transient oscillations following the keying pulse. Even if the gate circuit is of such design as not to be opened by these transient oscillations by themselves, it must be remembered that the television signal is also applied to the gate circuit so that the combination may cause the gate to open at a time when the burst is not present. This causes the phase of the reference carrier to vary considerably with the result that streaks of incorrect hues appear on the television screen.

Accordingly, it is another object of this invention to provide improved means for elimination or attenuating the harmonic content of the keying pulse in such manner as not to produce transient oscillation of a significant amplitude.

Briefly, this object may be attained by connecting a circuit that is resonant at the third harmonic and a reactive impedance element in series, the entire combination exhibiting series resonance at a frequency that is equal to $$f_{3h}\sqrt{\frac{1+k/3}{1+3k}}$$

where $k$ is the ratio of the amplitude of the third harmonic to the amplitude of the fundamental frequency. The output is taken across the reactive element or the resonant circuit, depending on the particular circuit used.

In television receivers, it is customary to control the phase of the line frequency oscillator by an automatic frequency control system wherein a phase detector derives a control voltage indicative of the difference in phase between the oscillator and the incoming synchronizing pulses. The control voltage is applied so as to control the frequency and phase of the oscillator. Circuits are provided for integrating the flyback pulses provided by the deflection circuit so as to produce a sawtooth wave, and this wave is applied to the phase detector. However, if a flyback pulse having a third harmonic is applied to the integration circuit, the resulting sawtooth has a region of lower slope in the approximate center of the steeper side of the sawtooth. Most circuits operate in such manner that the synchronizing pulse occurs at this point of lower slope. Because of the lower slope, the automatic frequency control system has less gain, and the stiffness of control is lost at a point where it is most needed. In order to overcome this difficulty, means are provided for increasing the overall gain of the automatic frequency control system so as to provide a compensation, but this involves extra expense. Hence, another use of the harmonic rejector circuit of this invention is to insert it in the automatic frequency control system. If, however, one rejector circuit is used in this manner in a color television receiver, and a second one is used in deriving the keying pulse for a gating circuit, there is a duplication of components. Furthermore, it is generally desirable to delay the keying pulse before it is applied to the gating circuit.

Accordingly, it is an object of this invention to provide a circuit for developing from a pulse having third harmonic distortion a keying pulse that is free from third harmonic distortion and means for delaying the pulse, and at the same time, without duplication of components, provide a sawtooth wave that may be applied to a phase detector that is also free from the effects of the third harmonic.

This objective can be attained by providing an integrating circuit that provides at different outputs, different amounts of integration. At the output of lesser integration, the phase of the keying pulse is shifted by a desired amount without a significant change in its shape. At the output of greater integration, a sawtooth wave is obtained that is suitable for application to the phase detector.

The manner in which these objectives may be attained will be better understood after the following discussion in conjunction with the drawings in which.

Figure 1:
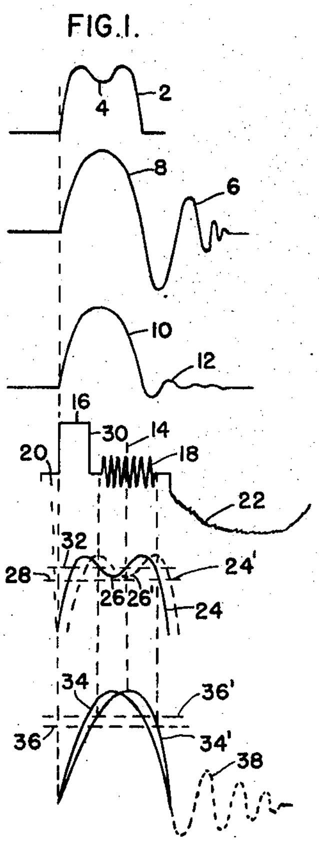
Figure 1 is a series of waveforms illustrating the operation of this invention as distinguished from the operation of prior art devices.

Referring to Figure 1, there is shown a pulse 2 derived from a source having a high degree of third harmonic content of such phase as to introduce a dip 4 at its center If the third harmonic is eliminated from the pulse 2 by circuits of the prior art, a series of transient oscillations 6 follows the main pulse 8. However, if applicant's third harmonic rejection circuit is used, the pulse appearing at its output is shown by the wave 10 wherein it will be noted that the transient oscillations 12 are of negligible amplitude. These waveforms correspond to oscillograms taken from actual tests. Although the harmonic rejector circuit of this invention may be used in various types of equipment, it is especially useful in a color television receiver as can be seen from the following discussion. Waveform 14 is a portion of the video signal recovered and includes a horizontal synchronizing pulse 16 and a burst 18 of several cycles of a predetermined phase of a color carrier frequency mounted on a horizontal blanking pulse 20. The video signal 22 occurs between the horizontal blanking pulses and generally contains many different frequencies including some in the vicinity of the frequency of the cycles in the burst 18.

A flyback pulse 24 having a strong third harmonic content, as indicated by the dip 26, may be derived from an electromagnetic deflection system in a manner well known to those skilled in the art. The third harmonic content is not desired, but in many types of deflection circuits, it is present. If the flyback pulse 24 is shifted in phase to the dotted position 24' so that its center occurs at the center of the burst 18, and if the gate circuit is constructed in such manner as to be open for all pulse amplitudes above a dotted line 28, the gate will not be closed by the third harmonic dip 26', but it may be open during the trailing edge 30 of the synchronizing pulse 16. As is well known to those skilled in the art, the trailing edge 30 possesses frequencies that may be much different from the frequency of the cycles in the burst so that its appearance at the output of the burst gate will cause substantial error in the phase or frequency of the reference wave recovered from the burst. On the other hand, if the difficulty is avoided by constructing the gate circuit in such manner that the gate circuit is open for pulse amplitudes above a dotted line 32, it will be noted that the gate is closed at the middle of the burst 18 by the third harmonic dip 26' so as to permit only the end portions of the burst 18 to reach the output of the gate circuit. For reasons previously discussed, this also causes an error in the reference wave derived from the burst. These difficulties are encountered whether or not the pulse 24 or the delayed pulse 24' is used. Therefore, I have found that some means must be provided for eliminating the third harmonic from the pulses 24 or 24'.

The phase shift necessary to center the keying pulse on the burst 18 may be done prior to the elimination of the third harmonic or afterwards and may or may not be necessary. However, it is generally desirable to produce such a phase shift for reasons which will subsequently be explained.

If the solid line flyback pulse 24 is applied directly to a third harmonic rejector circuit, the output pulse of that circuit will be as indicated by the wave 34. If the gating circuit is properly constructed, it will open for an interval during the portion of the keying pulse 34 that is above the dotted line 36, and it will be noted that this interval includes the entire burst but excludes the trailing edge 30 of the synchronizing pulse 16, as is necessary. However, the present standards are such that there is very little room for variation in such things as the amplitude of the pulse 34 and the level 36 at which the gate circuit opens. These difficulties are avoided if the keying pulse is delayed so as to be effectively centered on the burst as indicated by the pulse 34' as the gating circuit need only be opened for an interval during the occurrence of the portion of the pulse 34′ that is above the dotted line 36′. It can easily be seen that the amplitude of the keying pulse 34′ and potential 36′ at which the gate opens can fluctuate to a much greater degree without cutting off part of the burst 18 or including the trailing edge 30 in the signals applied to the gating circuit. Then two, because the gate circuit is opened for less time, the noise appearing at the input and output of the gate circuit will be much less. For these reasons it is highly desirable to provide a harmonic rejector circuit.

If prior art methods of eliminating the third harmonic are used, transient oscillations, such as represented by the dotted line 38, follow either of the keying pulses 34 or 34′, and it will be observed that they occur at the same time as the video signals 22 that represent the image. As previously pointed out, these transients may combine with the video signals to cause the gate circuit to open at a time when the bursts are not present. When this occurs, the reference wave varies radically in phase so as to cause the television receiver to produce incorrect colors.

Figures 3, 4:
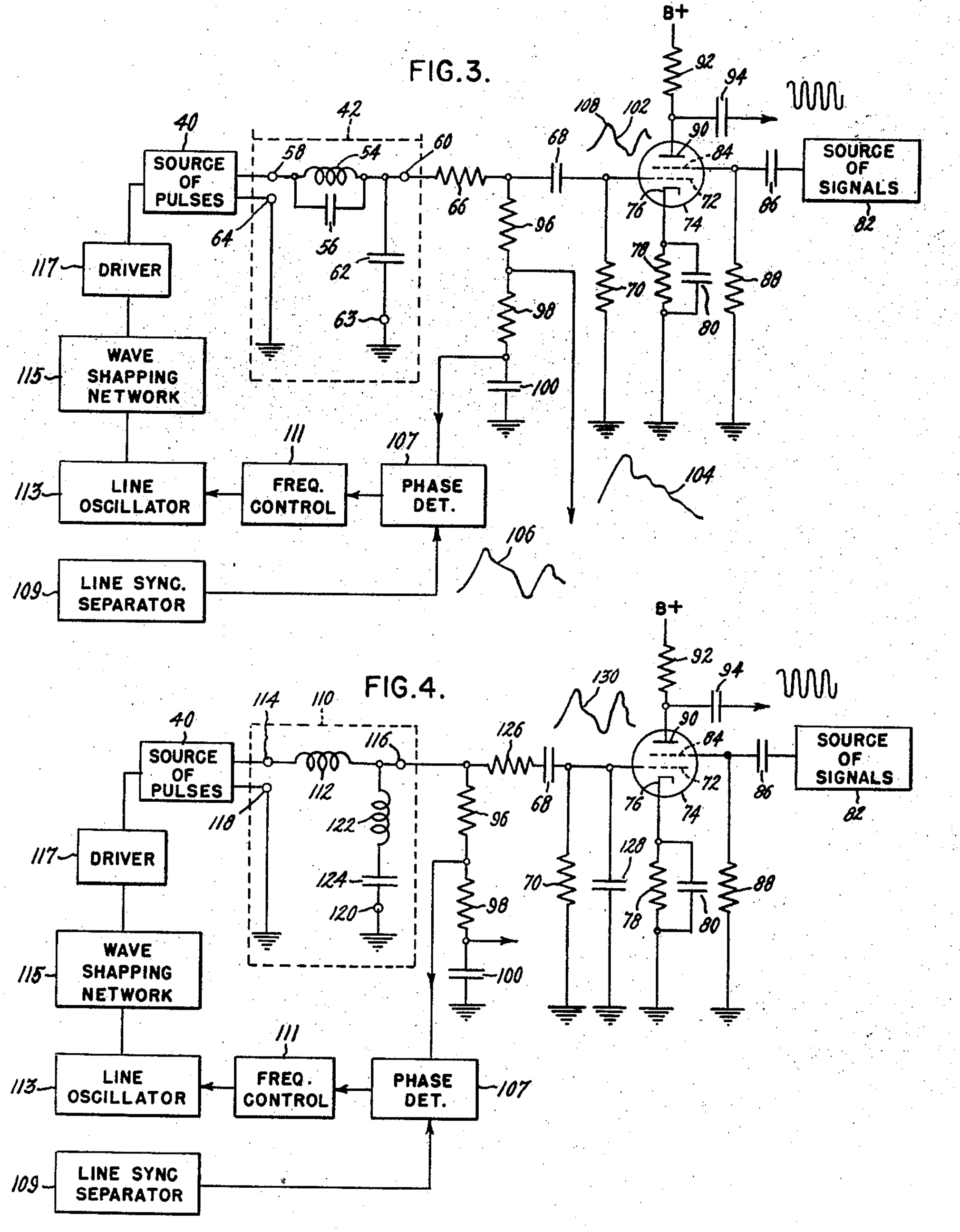
Figure 3 is a schematic diagram illustrating an embodiment of this invention.
Figure 4 is a schematic diagram illustrating another embodiment of this invention.

Reference is now made to Figure 3 wherein a source 40 of pulses having a third harmonic content is coupled to a filter constructed in accordance with the principles of this invention and included within the dotted rectangle 42. In a color television receiver, the source 40 could be the low voltage end of the auto transformer of an electromagnetic deflection system in which the transformer is tuned in such a manner that the third harmonic of the fundamental resonance frequency of the deflection system is present at the low voltage end. As is well understood by those skilled in the art, the fundamental resonance frequency is such that a half cycle occurs during the blanking pulse 20 of Figure 1. Usually, because the oscillation does not start at the very beginning of the blanking interval, the duration of a half cycle must be less than the duration of the blanking pulse 20, and in receivers constructed in accordance with the present standards is approximately fifty kilocycles.

Figure 2:
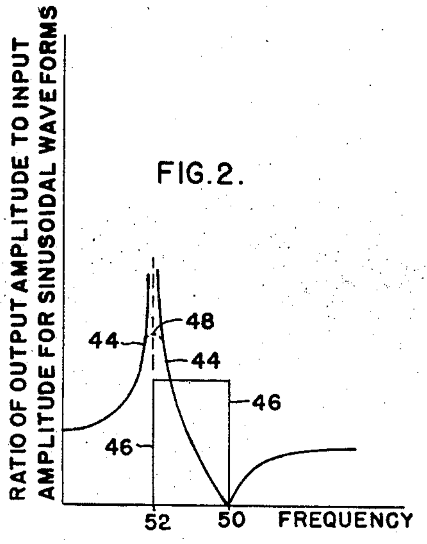
Figure 2 is a graph illustrating the amplitude response characteristic of a filter that is part of the present invention.

Although the filter 42 may assume various forms, it is preferable in accordance with the principles of this invention that whatever the form, it have a transfer characteristic H, i.e., the vectorial relationship between the output and input voltages as defined by the following expression:

$$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A the amplitude the input pulse would have if the third harmonic were not present; T is the width in microseconds of the input pulse at its axis or base; $k$ is the ratio of the amplitude of the third harmonic to the amplitude A and $w$ is any frequency expressed in radians per second. It is assumed that the input pulse is a half sine wave plus the third harmonic content. Furthermore, even though the third harmonic content has been discussed as being of such phase as to produce a dip in the center of the pulse provided by the source 40, it should be understood that this filter 42 can remove various phases of the third harmonic. Figure 2 is a graphical illustration of the transfer characteristic H defined by the aforesaid equation in which the solid line 44 indicates the ratio of output amplitude to input amplitude for various frequencies and the solid line 46 represents the difference in phase. In plotting these graphs, it has been assumed that there is no attenuation or amplification in the filter or in other words, that $B/A$ equals unity. The shape of the characteristic nor the operativeness of the filter is affected by attenuation or amplification as long as such is not frequency selective. In an actual filter not provided with an amplifier, there is always some attenuation so that the graph 44 does not go to infinity, but follows a dotted line 48, the exact shape of which depends on the amount of attenuation. When such a graph is drawn, it will be found that the third harmonic frequency occurs at point 50 and that the frequency, $f\alpha$ indicated at point 52 of theoretically infinite response is related to the third harmonic frequency $f_{3h}$, by the following expression:

$$f\alpha=f_{3h}\sqrt{\frac{1+k/3}{1+3k}}$$

where $k$ is the ratio of the amplitude of the third harmonic to the amplitude of the input pulse.

One circuit for obtaining such a transfer characteristic is illustrated in the dotted rectangle 42 of Figure 3 and is comprised of an inductor 54 and a capacitor 56 connected in parallel between an input terminal 58 and an output terminal 60. Another capacitor 62 is connected between the output terminal 60 and the other output terminal 63, which in the illustration is shown as being connected to ground, as is the other input terminal 64. In designing the filter, the inductor 54 is made to have an inductance of practical value, and the capacitor 56 is then made to have a capacitance such that the parallel circuit formed by them is resonant at the third harmonic frequency $f_{3h}$. The capacitance of the capacitor 62 is then made such that the parallel circuit 54, 56 and the capacitor 62 produce resonance between the input terminal 58 and the output terminal 63 at the frequency $f\alpha$. By way of example, the following values of the various elements of the circuit were found to be satisfactory when the circuit was used in a color television receiver in which the frequency of the flyback pulse was about fifty kilocycles, $L_{54}=68$ μh., $C_{56}=.002$ μf., and $C_{62}=.0013$ μf.

The output of the third harmonic rejector circuit 42 is coupled via the output terminal 60, a resistor 66, a capacitor 68 and a grid leak resistor 70 to a control grid 72 of a gating device, here shown as being an amplifier 74. As the lower end of the grid leak resistor 70 is connected to ground in this particular embodiment, it is effectively coupled to the other output terminal 63 of the rejector circuit 42. A cathode 76 of the amplifier 74 is connected to ground via a suitable protective biasing circuit comprised of a resistor 78 and a capacitor 80 connected in parallel. The time constant of the capacitor 68, the grid leak resistor 70 and the resistor 66 is such that the amplifier 74 is cut off between keying pulses. A source 82 of signals to be gated or keyed is shown as being coupled to a control grid 84 via a capacitor 86 and a grid leak resistor 88. Alternatively, it could be connected to the cathode of a triode amplifier. In a color television receiver, the source 82 might provide video signals such as illustrated in the wave 14 of Figure 1 or it might include a filter that excludes all frequencies except those in the vicinity of the color carrier. An anode 90 is connected through a suitable load impedance, here shown as a resistor 92, to a point of B+ potential. The output of the amplifier 74 appears at its anode 90 and may be coupled to any utility circuit via a coupling capacitor 94.

In order to delay the pulse appearing at the output of the rejector circuit 42 so that it is centered on the burst, an integration network comprised of resistors 96, 98 and a capacitor 100 in series is connected between the junction of the resistor 66 and the capacitor 68 and ground. This is well understood by those skilled in the art.

Owing to the large sum of the resistances 66, 96 and 98 with respect to the reactance of the capacitor 100 substantially no integration appears at the terminal 60. By suitably selecting the values of the resistances, a slight amount of integration is produced at the top of the resistor 96, so as to produce the desired delay in the peak of the keying pulse. Actually, it is a combination of a sawtooth wave produced by integration and the original pulse as indicated by the wave 102. Sufficient integration is provided at the junction of the resistors 96 and 98 to produce a sawtooth wave 104 in which there is some peaking. At the junction of the resistor 98 and the capacitor 100, a fully integrated sawtoothed wave 106 appears. Either of these sawtooth waves, 104 or 106, may be applied to the phase detector 107 and each will be free from the effects of the third harmonic. The fact that the wave 102 applied to the grid 72 has some sawtooth content is not of importance as the peak 108 is the only portion of the wave that causes the amplifier 74 to conduct.

A standard line sync separator 109 is also coupled to the phase detector 107 so that its output control voltage is indicative of the phase difference between the line synchronizing pulses and the sawtooth wave 106. A frequency control means 111 is coupled in the usual manner between the phase detector 107 and any suitable oscillator 113 that oscillates at line scanning frequency. In a customary manner, the output of the oscillator 113 is given the desired shape by a network 115 and its output is coupled to the source of pulses 40 via a suitable driver amplifier 117. As previously stated, the source 40 may be comprised of the usual deflection transformer that is tuned so as to have a third harmonic content in the flyback pulses at a point where it is desired to connect or couple the terminal 58. Generally, the point is at the low voltage end of the customary auto transformer. At this point the third harmonic is so phased as to produce a dip at the center of the flyback pulse.

The circuit of Figure 4 is similar to that of Figure 3 in its general operation, and corresponding components are therefore indicated by corresponding numerals. One difference is the construction of the third harmonic rejector circuit included in the dotted rectangle 110 which is comprised of an inductor 112 connected between an input terminal 114 and an output terminal 116, the other input terminal 118 and the other output terminal 120 being connected to ground in this particular embodiment. Between the output terminals 116 and 120, an inductor 122 and a capacitor 124 are connected in series. The inductor 122 and a capacitor 124 form a series circuit that is resonant at the third harmonic frequency $f_{3h}$, and the inductance of the inductor 112 has an inductance as to produce resonance with the inductor 122 and the capacitor 124 for a frequency $f\alpha$ which is related to the frequency $f_{3h}$ by the following expression:

$$f\alpha=f_{3h}\sqrt{\frac{1+k/3}{1+3k}}$$

A resistor 126 and a capacitor 128 serve to integrate the pulse so as to delay its peak and produce a wave 130 at the grid 72. Once again the sawtooth content can be neglected.

While I have illustrated a particular embodiment of my invention, it will of course of understood that I do not wish to be limited thereto, since various modifications, both in the circuit arrangement and in the instrumentalities, may be made and I contemplate by the appended claims to cover any such modification as fall within the true spirit and scope of the invention.

What I claim as new and desire to secure by Letters Patent of the United States is:

1. In a color television receiver a circuit comprising a source of keying pulses of line scanning frequency, the keying pulses being one half a sine wave having a third harmonic content, a gating circuit, a source of signals, means for coupling said signals to said gating circuit, and a filter coupled between said source of keying pulses and said gating circuit, said filter being adapted to reduce the third harmonic in said keying pulses.

2. A circuit as set forth in claim 1 wherein said filter has a transfer characteristic H as indicated by the following expression $$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A is the amplitude of the input pulse without third harmonic, T is width of the input pulse in micro-seconds, $k$ is the ratio of the amplitude of the third harmonic to the amplitude A, and $w$ is the frequency in radians per second.

3. A circuit as set forth in claim 1 wherein said filter is comprised of a pair of input terminals, a pair of output terminals, a tuned circuit comprised of an inductor and a capacitor and a reactive impedance element connected in series between a first one of said input terminals and a first one of said output terminals, said tuned circuit being resonant at the frequency of the third harmonic of said sine wave pulses, and said tuned circuit and said reactive impedance element being resonant at a frequency $f\alpha$ which is related to the third harmonic frequency by the expression $$f\alpha=f_{3h}\sqrt{\frac{1+k/3}{1+3k}}$$

where $k$ is the ratio of the amplitude of the third harmonic of the input pulse to the amplitude of the input pulse without third harmonic, a direct connection between a second of said pair of input terminals and said first output terminal, and a second output terminal connected to the junction of said tuned circuit and said reactive impedance element.

4. In a color television receiver a circuit comprising a source of pulses of line scanning frequency, the pulses being one half a sine wave having a third harmonic content, a gating circuit, a source of video signals coupled to said gating circuit, a filter for reducing the third harmonic content of said pulses without causing a transient oscillation to follow said pulses, said filter comprising first and second input terminals and first and second output terminals, said first and second input terminals being coupled to said source of pulses means for coupling said output terminals to said gating circuit, an inductor and a first capacitor connected in parallel between said first input terminal and said first output terminal, a second capacitor connected between said output terminals and a direct current connection between said second input terminal and said second output terminal, the inductance of said inductor and the capacitance of said first capacitor being such as to produce parallel resonance at the frequency of the third harmonic, and the value of said second capacitor being such that it produces series resonance with the parallel circuit formed by said inductor and said first capacitor at a frequency $f\alpha$ which is related to the frequency of the third harmonic $f_{3h}$ by the expression, $$f\alpha=f_{3h}\sqrt{\frac{1+k/3}{1+3k}}$$

so as to produce a transfer characteristic H between said input and output terminals represented by the expression $$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A is the amplitude of the input pulse without third harmonic, T is width of the input pulse in micro-seconds, $k$ is the ratio of the amplitude of the third harmonic to the amplitude A, and $w$ is the frequency in radians per second.

5. A filter for reducing the third harmonic in half sine wave pulses without causing a transient oscillation to follow said pulses, said filter comprising first and second input terminals, and first and second output terminals, an inductor and a first capacitor connected in parallel between said first input terminal and said first output terminal, a second capacitor connected between said output terminals and a direct current connection between said second input terminal and said second output terminal, the inductance of said inductor and the capacitance of said first capacitor being such as to produce parallel resonance at the frequency of the third harmonic, and the value of said second capacitor being such that it produces series resonance with the parallel circuit formed by said inductor and said first capacitor at a frequency $f\alpha$ which is related to the frequency of the third harmonic $f_{3h}$ by the expression, $$f\alpha=f_{3h}\sqrt{\frac{1+k/3}{1+3k}}$$

so as to produce a transfer characteristic H between said input and output terminals represented by the expression $$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A is the amplitude of the input pulse without third harmonic, T is width of the input pulse in micro-seconds, $k$ is the ratio of the amplitude of the third harmonic to the amplitude A, and $w$ is the frequency in radians per second.

6. A filter for reducing the third harmonic content of half sine wave pulses without causing transient oscillation to follow said pulses, said filter comprising first and second input terminals, and first and second output terminals, a first inductor connected between said first input terminal and said first output terminal, a second inductor and a capacitor connected in series between said output terminals, a direct current connection between said second input terminal and said second output terminal, the inductance of said second inductor and the capacitance of said capacitor being such as to produce series resonance at the third harmonic frequency, the inductance of said first inductor, said second inductor and the capacitance of said capacitor being such as to produce series resonance at a frequency $f\alpha$ that is related to the third harmonic frequency $3f_{3h}$ by the expression $$f\alpha=f_{3h}\sqrt{\frac{1+k/3}{1+3k}}$$

so as to produce a transfer characteristic H equal to $$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A is the amplitude of the input pulse without third harmonic, T is width of the input pulse in micro-seconds, $k$ is the ratio of the amplitude of the third harmonic to the amplitude A, and $w$ is the frequency in radians per second.

7. In a color television receiver, an electromagnetic deflection system having a line scanning oscillator, a phase detector and means for controlling the frequency and phase of said oscillator in response to the output of said phase detector, a source of line synchronizing pulses, means for coupling the latter pulses to said phase detector, a gating circuit, means including an integration network for coupling flyback pulses produced by said electromagnetic deflection system to said gating circuit, and means for coupling an output of said integration network to said phase detector.

8. The circuits as set forth in claim 7 wherein the electromagnetic deflection system produces half sinusoidal flyback pulses having a third harmonic content and wherein said means for coupling said flyback pulses to said gating circuit includes a filter for reducing the third harmonic content prior to the application of the flyback pulses to said integration network.

9. A circuit as set forth in claim 8 wherein said filter has a transfer characteristic H is represented by the following expression $$H=\frac{\frac{B}{A}}{1+3k\frac{\left(\frac{wT}{\pi}\right)^2-1}{\left(\frac{wT}{\pi}\right)^2-9}}$$

where B is the amplitude of the output pulse, A is the amplitude of the input pulse without third harmonic, T is width of the input pulse in micro-seconds, $k$ is the ratio of the amplitude of the third harmonic to the amplitude A, and $w$ is the frequency in radians per second.

References Cited in the file of this patent

UNITED STATES PATENTS

| | | |
|---|---|---|
| 2,654,855 | Denton | Oct. 6, 1953 |
| 2,664,523 | Spradlin | Dec. 29, 1953 |
| 2,686,276 | Anderson | Aug. 10, 1954 |
| 2,701,851 | Palmer | Feb. 8, 1955 |
| 2,729,766 | Vilkomerson | Jan. 3, 1956 |
| 2,830,115 | Kelly | Apr. 8, 1958 |

OTHER REFERENCES

Rider Manual, vol. 14, Motorola TV, pages 14–39, 40, Jan. 11, 1955.

Alternating-Current Circuits, Kerchner and Corcoran, third edition, John Wiley and Sons, Inc., copyright 1951, pages 130–131 relied on.

MIT Radiation Laboratories Series, Waveforms, pp. 548–549, McGraw-Hill Book Co., 1949.

Skilling Electric Transmission Lines, pp. 253–256, McGraw-Hill Book Co., 1951.